US009512377B2

(12) United States Patent
Binder et al.

(10) Patent No.: US 9,512,377 B2
(45) Date of Patent: Dec. 6, 2016

(54) PROCESS FOR PRODUCTION OF NANOPARTICLES OF SOLID LUBRICANT AND LUBRICANT DISPERSIONS STABLE IN OIL AND IN WATER

(75) Inventors: Roberto Binder, Joinville-Sc (BR); Fernando Withers Torres, Joinville-Sc (BR); Valderes Drago, Florianopolis-Sc (BR); Cristian Bernardi, Florianopolis-Sc (BR); Aloisio Nelmo Klein, Florianopolis-Sc (BR); Cristiano Binder, Florianopolis-Sc (BR); Andre Messias Teixeira, Sao Jose-Sc (BR)

(73) Assignees: Whirlpool S.A., São Paulo-Sp (BR); Universidade Federal De Santa Catarina, Florianopolis-Sc (BR)

( * ) Notice: Subject to any disclaimer, the term of this patent is extended or adjusted under 35 U.S.C. 154(b) by 194 days.

(21) Appl. No.: 14/131,582

(22) PCT Filed: Jul. 12, 2012

(86) PCT No.: PCT/BR2012/000241
§ 371 (c)(1),
(2), (4) Date: Apr. 11, 2014

(87) PCT Pub. No.: WO2013/006936
PCT Pub. Date: Jan. 17, 2013

(65) Prior Publication Data
US 2014/0221259 A1 Aug. 7, 2014

(30) Foreign Application Priority Data

Jul. 12, 2011 (BR) .................................... 1103449

(51) Int. Cl.
*C01G 39/06* (2006.01)
*C10M 171/00* (2006.01)
(Continued)

(52) U.S. Cl.
CPC ............ *C10M 103/06* (2013.01); *C01G 39/06* (2013.01); *C01G 41/00* (2013.01); *C10M 177/00* (2013.01);
(Continued)

(58) Field of Classification Search
CPC ..................... C10M 103/06; C10M 2201/065
USPC ........................................ 508/167; 423/561.1
See application file for complete search history.

(56) References Cited

U.S. PATENT DOCUMENTS

2004/0053791 A1* 3/2004 Langer ................. C10M 171/00
508/154
2005/0065044 A1* 3/2005 Migdal ................ C10M 171/06
508/230
2010/0078588 A1 4/2010 Pettersen

OTHER PUBLICATIONS

Fei-Ling Pua et al: Preparation of Transition Meal Sulfide Nanoparticles via Hydrothermal, Sains Malaysiana: Journal of Natural Sciences, National University of Malaysia, vol. 39, No. 2, Apr. 1, 2010, pp. 243-248.
(Continued)

*Primary Examiner* — Prem C Singh
*Assistant Examiner* — Francis C Campanell
(74) *Attorney, Agent, or Firm* — Dinsmore & Shohl LLP

(57) ABSTRACT

The process basically comprises: dissolving a lamellar disulphide, as a source of the solid lubricant, in an aqueous solvent, forming a first aqueous solution; dissolving a reducing agent, as hydroxylamine, sodium hypophosphite or sodium borohydride, in an aqueous solvent, forming a second aqueous solution; mixing the first and second aqueous solutions, forming a third aqueous solution; neutralizing the pH of the third aqueous solution; dissolving a sulphur source, in an aqueous solvent, forming a fourth aqueous solution; mixing the third and fourth aqueous solutions, forming a fifth aqueous solution, which is contained and heated in an autoclave; cooling the fifth aqueous solution to the room temperature; and removing, from the autoclave, the nanoparticles in powder form.

13 Claims, 3 Drawing Sheets

(51) Int. Cl.
*C10M 103/06* (2006.01)
*C01G 41/00* (2006.01)
*C10M 177/00* (2006.01)
*B82Y 30/00* (2011.01)
*B82Y 40/00* (2011.01)

(52) U.S. Cl.
CPC ............... *B82Y 30/00* (2013.01); *B82Y 40/00* (2013.01); *C01P 2004/32* (2013.01); *C01P 2004/62* (2013.01); *C10M 2201/053* (2013.01); *C10M 2201/065* (2013.01); *C10M 2201/066* (2013.01); *C10N 2210/06* (2013.01); *C10N 2220/082* (2013.01); *C10N 2250/08* (2013.01); *C10N 2250/10* (2013.01); *C10N 2270/00* (2013.01)

(56) References Cited

OTHER PUBLICATIONS

Bakunin V N et al: "Synthesis and Application of Inorganic Nanoparticles as Lubricant Components—a Review", Journal of Nanoparticle Research; An Interdisciplinary Forum for Nanoscale Science and Technology, Kluwer Academic Publishers, DO, vol. 6, No. 2, Jun. 1, 2004, pp. 273-284.

International Search Report and Written Opinion dated Oct. 17, 2012, International Application No. PCT/BR2012/000241, filed Jul. 12, 2012.

\* cited by examiner

PROCESS FOR PRODUCTION OF NANOPARTICLES OF SOLID LUBRICANT AND LUBRICANT DISPERSIONS STABLE IN OIL AND IN WATER

FIELD OF THE INVENTION

The present invention refers to a process for the production of nanoparticles of a solid lubricant, as for example, molybdenum disulphide ($MoS_2$), in the form of nanoflowers or nanospheres, which, after a convenient surface treatment, present a lipophilic or hydrophilic behavior. The lipophilic particles are used as additives to make dispersions with lubricant oils and, the hydrophilic particles, dispersions with water. In both cases, it is formed a mixed lubricant with tribological gains. The aqueous dispersions are appropriate for milder tribological regimes, whilst the dispersions with oils are appropriate for more severe regimes.

BACKGROUND OF THE INVENTION

The increasing cost of petroleum products, together with the society's demand for industrial practices that do not harm the environment require constant development of the lubricant market. In this sense, the incorporation, to a lubricant oil, of solid nanoparticles of a lubricant lamellar material, makes said nanoparticles act as a friction modifying additive which also improves the lubricity and lifetime of the lubricant oil.

Said incorporation of solid lubricant nanoparticles to a lubricant oil may dispense the use of other synthetic chemical additives, which are typically used to increase the viscosity and chemical stability of lubricant oils, allowing the use of low-viscosity oils and leading to economic gains.

The molybdenum disulphide ($MoS_2$) is a lamellar material with a weak interaction between its layers, which fact makes it be widely used in solid lubrication in vacuum or in the absence of oxidant agents, as water vapor and oxygen, as well as mixed in greases and oils (A. R. Lansdown, Molybdenum Disulphide Lubrication, Tribology Series 35, Elsevier 1999).

The molybdenum disulphide ($MoS_2$), in its microcrystalline form, does not disperse in oil neither in water. That is why its applicability as additive in mixed lubrication has to overcome this technological difficulty. When in the nanometric dimension, this difficulty can be overcome by functionalizing (sometimes also characterized as capping) the nanoparticles of molybdenum disulphide ($MoS_2$) through a second reagent, of the family of thiols, phosphines, dithiocarbamates and the like, most of all harmful to the environment. Thus, it can be formed very stable suspensions of MoS2 nanoparticles in oils, constituting a mixed lubrication product with significant gains in lubricity. However, these reagents, as they become worn under friction, will almost always produce secondary reactions with the lubricant oil, causing its consequent premature degradation. The present invention brings a new approach for the dispersion of MoS2 nanoparticles without the need of these aggressive capping agents.

The transformation of the MoS2 nanoparticles in hydrophilic particles, made with friendly capping agents, makes it possible to use them as additive in pure water, forming a new type of mixed lubricant appropriate for mild regimes, in which the uncoupling of the capping agent does not occur.

PRIOR ART

The molybdenum disulphide has applications in solid and mixed lubrication, as a catalyst in the hydrodesulfurization of hydrocarbons, and also in solid-state batteries and in devices for converting light into electric energy (Wypych F., "Molybdenum disulphide, a multifunctional and remarkable material", Quimica Nova vol. 25, p. 83-88, 2002). There-fore, there is an abundant literature relating to the production of $MoS_2$ nanostructures, which evidences how their properties are modified as a function of the dimensions, and as a function of the different morphologies produced. With respect to the area of the mixed lubrication, it can be cited the following patent documents:

WO2002/034959 and U.S. Pat. No. 7,641,886 describe the production of MoS2 nanoparticles with the fullerene form, by reducing, in the gas phase, the molybdenum compounds with $H_2S$, and also the use of said nanoparticles in mixed lubrication. However, as it is well known, the $H_2S$ is an extremely toxic gas.

WO2001/94504 A2 and U.S. Pat. No. 6,878,676 refer to the production, by the microemulsion method, of spherical $MoS_2$ nanoparticles modified by functionalizing agents which provide their solubility in hydrocarbons, enabling their application as additive in mixed lubrication. Nevertheless, this method cannot be applied in industrial scale and uses expensive inputs which generate a large amount of organic product waste.

WO2007/082299 A2, US2008/0234149 A1 and US2008/0312111 A1 refer to the production, by the mechanical milling method, reactive or not, of MoS2 nanoparticles, structured or not, with a capping layer of organic compounds and, in general, making use of emulsifiers, surfactants or dispersants. Therefore, these prior art solutions require the provision of additional agents, almost always harmful to the environment and which tend to generate organic waste.

It is also known the hydrothermal synthesis method which comprises chemical reactions which occur in aqueous solution in a closed system (autoclave), in temperatures above room temperatures and under autogenous pressures. In this method, the working pressures are of about 20 atmospheres and the temperatures are moderate, ranging from 100° C. to 400° C. When the solvent typically used in the process is mixed or non-aqueous, the term solvothermal is used.

The hydrothermal and solvothermal methods have several advantages in relation to the conventional processes for the production of nanostructured materials, such as: energy saving, simplicity, cost ranging from moderate to low, better nucleation control, high reaction rates (higher yields), the possibility of controlling the form of the nanoparticles, a large-scale applicability, and operation at moderate temperatures. The disadvantages include the impossibility of observing the progress of the reactions, and also a greater reaction time.

There are several disclosures in literature about the production of molybdenum disulphide nanoparticles and microspheres by the hydrothermal method (Peng, Y. Meng Z., Zhong C., Lu J., Weichao Y., "Hydrothermal Synthesis of $MoS_2$ and its Pressure-Related Crystallization", *Journal of Solid State Chemistry*, 159, p. 170-173, 2001; Bokhimi X., Toledo J. A., Navarrete J. Sun X. C., Portilla M., "Thermal evolution in air and argon of nanocrystalline $MoS_2$ synthesized under hydrothermal conditions", *International Journal of Hydrogen Energy*, 26, p. 1271-1277, 2001; Li Q., Li M., Chen Z., Li C., "Simple solution route to uniform $MoS_2$ particle with randomly stacked layers", *Materials Research Bulletin*, 39, p. 981-986, 2004; Tian Y., He Y., Zhu Y., "Low temperature synthesis and characterization of molybdenum disulphide nanotubes and nanorods", *Materials Chemistry* and *Physics*, 87, p. 87-90, 2004; Tian Y., Zhao J., Fu W., Liu Y., Zhu Y., Wang Z., "A facile route to synthesis of nanorods", *Materials Letters*, 59, p. 3452-3455, 2005; Tian Y., Zhao X., Shen L., Meng F., Tang L., Deng Y., Wang Z., "Synthesis of amorphous $MoS_2$ nanospheres by hydrothermal reaction", *Materials Letters*, 60, p. 527-529, 2006; Li G., Li C., Tang H., Cao K., Chen J., Wang F., Jin Y., "Synthesis and characterization of hollow $MoS_2$ microspheres grown from $MoO_3$ precursors", *Journal of Alloys and Compounds*, 501, p. 275-281, 2010).

Many of these studies use, as a molybdenum source, reagents made in laboratory, as is the case of the thiomolybdate, whose preparation is laborious, uses expensive and toxic reagents and must be made in laboratory due to its physical-chemical instability, making it industrially unfeasible. As a sulphur source, they use the sodium sulfite, or the thioacetamide, or the potassium thiocyanate, all three expensive and aggressive to the environment. Some of said proposals use the hydrazine as a reducing agent, whose handling is dangerous, since it is a mutagenic agent. An updated review of these processes can be found in Afanasiev P., "Synthetic approaches to the molybdenum sulfide materials", *C. R. Chimie*, 11, p. 159-182, 2008.

In the proposal of Wei R., Yang H., Du K., Fu W., Tian Y., Yu Q., Liu S., Li M., Zou G., "A facile method to prepare $MoS_2$ with nanoflowers-like morphology", *Materials Chemistry and Physics* 108, p. 188-191, 2008, the authors present a production of $MoS_2$ nanoflowers using the ammonium molybdate as a molybdenum source, the thioacetamide as a sulphur source and the sodium dithionite as a reducing agent. This production is conducted in autoclave at 180° C. and, although mentioning the obtention of $MoS_2$ "nanoflowers", it defines the dimensions of the latter as ranging from 1.0 to 0.1 microns. Moreover, judging by the presented micrographs, the produced particles present a high degree of aggregation and, apparently, do not disperse in oils or other organic medium, since this property is not mentioned by the authors.

The documents related to the solvothermal method, for the production of molybdenum disulphide nanostructures, are much less frequent (Zhan J. H., Zhang Z. D., Qian X. F., Wang C., Xie Y., Qian Y. T., "Solvothermal Synthesis of Nanocrystalline $MoS_2$ from $MoO_3$ and Elemental Sulphur", *Journal of Solid State Chemistry*, 141, p. 270-273. 1998), and refer to the formation of $MoS_2$ spheres with diameters from 100 to 200 nm from the molybdenum trioxide, elemental sulphur and hydrazine using pyridine as a solvent at 300° C.

On the other hand, the document Peng Y., Meng Z., Zhong C., Lu J., Yang Z., Qian Y., "Tube-and Ball-like amorphous $MoS_2$ prepared by solvothermal method", *Materials Chemistry and Physics*, 73, p. 327-329, 2002, using also the pyridine as a solvent, but at a temperature of 190° C., obtains spheres with diameters of 1.0 micron mixed with tubes with diameters of 0.60 microns, both very deformed, but with dimensions much larger than in the previous reference. Finally, the solution of Danmei Zhou X., Fu X., Shi H., Wang D., Hu Z. W., "Synthesis and characterization of molybdenum disulphide micro-sized solid spheres", *J. Mater Sci*, 41, p. 5682-5686, 2006, using a mixed solvent formed by 50% water and 50% ethanol and the toxic reagents, hydrazine and thiosemicarbazide, produces $MoS_2$ spheres also with diameters in the range of 0.5 to 2.0 microns and which are highly dispersive.

Thus, it can be observed that the hydrothermal method is a better option to produce nanostructures with more controllable dimensions and forms.

Dispensing the capping of the nanoparticles is very interesting, because of the inconveniences it could bring along the aging under severe work of the lubricant dispersions, and which are evidenced hereinafter.

The mechanism of the tribological action of the molybdenum disulphide is strongly determined by the properties of the capping layer, which complicates the initial stages of the physical-chemical adsorption of the friction modifying additive, the last action being determinant for the formation of the tribofilm onto the surface to be lubricated. Moreover, the sulphur is a component undesired in lubricant oils. In high temperatures and under severe conditions, even the less aggressive sulphur forms can, by decomposition, form "free" sulphur which reacts negatively with the oil molecules, which can also cause corrosion in the metal wall and, in some cases, the hardening of the sealing rubbers of the machines. Therefore, it can be troublesome to provide the capping of the nanoparticles with reagents containing sulphur from the thiol and dithiocarbamate families, which are widely cited in academic studies (Paranengo O. P., Bakunin V. N., Kuz'mina, Suslov A. Yu., Vedeneeva L. M. "Molybdenum sulfide nanoparticles as new-type additives to hydrocarbon lubricants", *Chemical Technology*, 383, p. 84-86 2002). On the other hand, the capping agents containing phosphorus in its constitution, as the phosphines which, besides being toxic, under severe work they originate decomposition products which can produce deleterious effects in the automotive catalytic systems for controlling emission of pollutants, and which should also be avoided.

There can be found, in literature, other types of capping agents which are used in MoS2 nanoparticles (Tahir N. M., Zink N., Marc E., Therese H. A., Kolb U., Theato P., Tremel W. "Overcoming the Insolubility of molybdenum disulphide nanoparticles through a high degree of sidewall functionalization using polymeric chelating ligands", *Angewandte Chemie*, 118, p. 4927-4933, 2006), for functionalizing said molybdenum disulphide nanoparticles with nitrilotriacetic acid.

The technical solution cited in the reference Zhou X., Wu D., Shi H., Hu Z., Wang X., Yan F. "Study on tribological properties of surfactant-modified $MoS_2$ micrometer spheres as an additive in liquid paraffin", *Tribology International*, 40, p. 863-868, 2007, functionalizes the molybdenum disulphide with an ammonium salt (not commercial) which is prepared in laboratory.

On the other hand, the solution described in the reference Hu K. H., Liu M., Wang Q. J., Xu F. Y., Scharaube S., Hu X. G. "Tribological properties of molybdenum disulphide nanosheets by monolayer restacking process as additive in liquid paraffin", *Tribology International*, 42, p. 33-39, 2009, functionalizes the $MoS_2$ nanosheets with lithium using n-butyl lithium in a hexane solution. The capping agents cited above have a high toxicity, present high cost, or they are not commercially available.

Thus, the known processes for the production of molybdenum disulphide nanoparticles make use of reagents which are not commercially available, toxic and costly, making its application industrially unfeasible.

Moreover, the known processes are not effective to produce functionalized nanoparticles, so as to allow the production of dispersions in lubricant oil, as well as stable aqueous lubricant dispersions and other lubricant dispersions using different liquid carriers.

The comments mentioned above also reveal that the known capping agents, which are necessary for the functionalization of the molybdenum disulphide nanoparticles, present costs and a degree of toxicity that are unacceptable and, furthermore, require to be produced in laboratory, since some of them are not commercialized products.

OBJECT OF THE INVENTION

The present invention has, as a general object, to provide a process for the massive manufacture of individual nanoparticles of molybdenum disulphide ($MoS_2$) or of tungsten disulphide ($WS_2$), with a morphology in nanosphere or in nanoflower, with an aspect of a solid and loose powder to facilitate its processing, and which is capable to allow, after proper functionalizations, the formation of lubricant compositions which are stable in oil and in water.

More specifically, the present invention has as one of its objects to form a stable emulsion with lubricant oils, from molybdenum disulphide nanoparticles in nanospheres or in nanoflowers, which are functionalized to become lipophilic nanoparticles, not requiring the use of emulsifiers or surfactants.

Through a solvothermal process, the nanoparticles, with a morphology in nanosphere or in nanoflower, become lipophilic nanoparticles, defining a good friction modifying agent to be incorporated in lubricant oils, which are very useful in different applications, as for example, in hermetic compressors, dispensing the addition of other chemical additives which are usually added, to increase the viscosity and durability of the lubricant oils. The process for production of the nanoparticles can be made in large scale and uses low-cost environmentally friendly inputs.

Still specifically, the present invention has also the object to turn hydrophilic the MoS2 or $WS_2$ nanoparticles, with a morphology in nanosphere or in nanoflower, by means of their functionalization with environmentally friendly products, in order to form a stable dispersion in water, originating a new type of lubricant composition in which the base is no longer the oil, but water.

As mentioned above, the invention allows obtaining a fluid and inorganic lubricant composition, constituted only by water and the new MoS2 nanoparticles, with a morphology in nanosphere or in nanoflower. In this case, the invention also includes the provision of a new technique for functionalizing said nanoparticles with cost effective and friendly capping agents, such as ethylene glycol (EG), polyethylene glycol (PEG), polyvinyl pirrolidona (PVP) and the like, as well as shellac and the like, allowing obtaining new functionalized nanoparticles, presenting hydrophilic characteristics necessary for the production of an aqueous lubricant composition in the form of a stable dispersion of said nanoparticles in water.

These dispersions of $MoS_2$ in water, when used as lubricant element, will present gains in the tribological properties; in this invention, said dispersions are proposed as a second field of application, constituting a new type of fluid for aqueous mixed lubrication, especially applicable for non-severe tribological regimes.

In the present invention, it is used a method of the hydrothermal type for the production of $MoS_2$ nanostructures with new synthesis routes in which, as the molybdenum source, it can be used ammonium molybdate, or metallic molybdenum, or molybdenum trioxide ($MoO_3$). Both the thiourea and the elemental sulphur ($S_8$) are used as sulphur sources and, as reducing agents, it can be used hydroxylamine, or sodium hypophosphite, or sodium dithionite, or sodium borohydride. All these reagents are more cost effective and less aggressive than the ones cited above.

By using said reagents, this invention provides the manufacture of nanoparticles with the morphology of nanoflowers and nanospheres, presenting diameters which can vary from 20 to more than 1000 nanometers, and which are not aggregated, almost mono-dispersive in some cases, and in the form of a solid and loose powder form. In a way of carrying out the invention, when focused on the production of lubricant compositions in oil, said powder is submitted to a functionalization by means of solvothermal treatment in an adequate solvent, to transform the nanoparticles, in the form of nanoflowers or nanospheres, in lipophilic nanoparticles, which thus acquire the property of forming stable dispersions when dispersed in oils and other organic mediums. That is, the MoS2 or $WS_2$ nanoparticles produced, in batches, by the production process of the present invention, can be used, after the functionalization to the lipophilic condition, as additive for lubricant oils, dispensing the use of other additives, potentially increasing the economic gains.

In another way of carrying out the invention, when directed to the production of lubricant compositions in water, said powder is submitted to an adequate capping, to transform the nanoparticles, in the form of nanoflowers or nanospheres, into hydrophilic nanoparticles, which thus acquire the property of forming stable aqueous dispersions. That is, the MoS2 or $WS_2$ nanoparticles produced, in batches, by the production process of the present invention can be used, after the functionalization to the hydrophilic condition, as additive for mixed lubricants in aqueous base, for different applications.

DESCRIPTION OF THE INVENTION

Process for Production of Nanoparticles

Figure 1A:
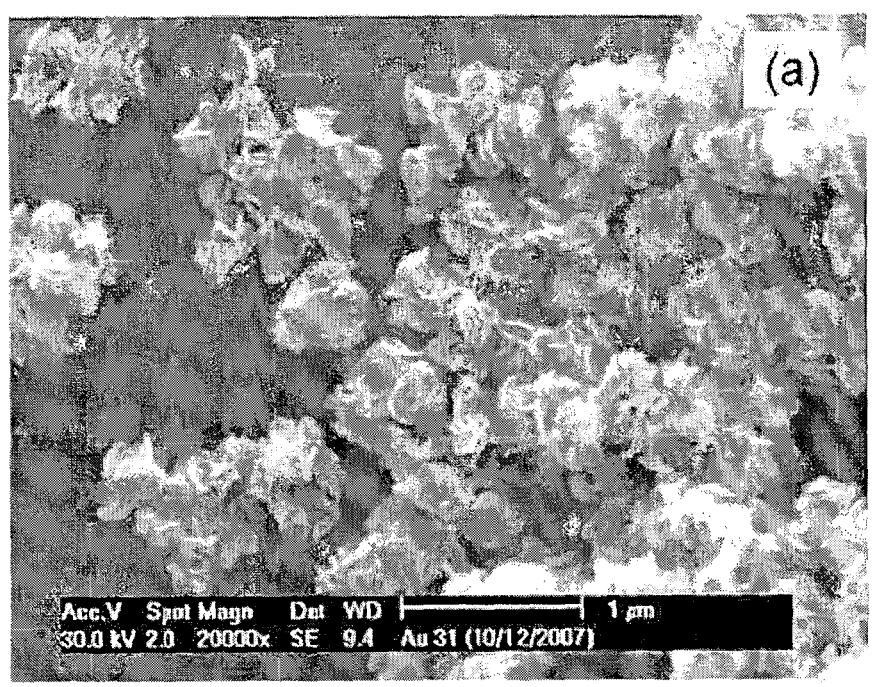
FIG. 1A represents a micrograph (MEV) of the sample of Example 1, in which it can be observed the formation of nanoflowers with an average diameter of 250 nm.

The process for production of nanoparticles, with the morphology of nanoflowers or nanospheres, constituted by lamellar metal disulphides, as for example, the molybdenum disulphide and the tungsten disulphide, to posteriorly form fluid lubricant compositions based on oil (for use, for example, in hermetic compressors) or on water, comprises the following steps:

a—dissolving, under stirring, a source of the metallic element which defines the solid lubricant, selected from the lamellar metal disulphides commented above and containing said metallic element in concentrations from millimolar to 1.0 molar, in a solvent comprising water and heated between 50° C. and 90° C., forming a first aqueous solution;

b—dissolving, under stirring, a reducing agent selected from hydroxylamine, sodium hypophosphite ($NaH_2PO_2$) and sodium borohydride ($NaBH_4$), in a solvent comprising water and heated between 50° C. and 90° C., forming a second aqueous solution;

c—mixing the first and second aqueous solutions, forming a third aqueous solution, containing the metallic element which defines the solid lubricant and the reducing agent;

d—adjusting the pH of the third aqueous solution, to a neutral condition, that is, to a value between 7.0 and 7.5;

e—dissolving, under stirring, a sulphur source, preferably selected from thiourea and elemental sulphur, in concentrations preferably ranging from 20 millimolar to 2.20 molar, in a solvent comprising water and heated between 50° C. and 90° C., forming a fourth aqueous solution;

f—mixing the third and fourth aqueous solutions, forming a fifth aqueous solution, containing the metallic element, the reducing agent and the sulphur;

g—containing the fifth aqueous solution in an autoclave, generally in stainless steel and lined with Teflon, and submitting the fifth aqueous solution to heating, for example, in a muffle furnace, by a period from 3 h to 150 h, and at a temperature from 100° C. to 350° C.;

h—cooling the fifth aqueous solution, still contained in the autoclave, for example, by forced ventilation, to the room temperature, and within a determined time as a function of the morphological characteristics of the nanoparticles to be obtained; and i—removing, from the autoclave, the nanoparticles obtained in the powder form, and submitting them to water-washing and drying operations.

In case of using the molybdenum disulphide, the temperatures for formation of the first, second and fourth aqueous solutions are, preferably, of 70° C. In the present disclosure, the water used for the dissolutions and for the formation of the aqueous lubricant composition should be considered as being preferably distilled water.

The present process can be carry out using, as the source of the metallic element which defines the solid lubricant, any of the compounds selected from ammonium molybdate (($NH_4)_6Mo_7O_{24} \cdot 4H_2O$), metallic molybdenum (Mo), molybdenum dioxide ($MoO_2$) and, molybdenum trioxide ($MoO_3$) or, in the case of tungsten, selected from sodium tungstate ($Na_2WO_4 \cdot 2H_2O$), tungstic acid ($H_2WO_4$), tungstic anhydride ($WO_3$) and tungsten oxide IV ($WO_2$), in concentrations which can range from 8.0 millimolar to 1.0 molar. In the case of the ammonium molybdate, it is used, preferably, the concentration of 16 millimolar. It can be also used combinations in different proportions of the cited molybdenum and tungsten compounds.

The reducing agent used in the present process, and previously defined, is present in concentrations which can range from 20 millimolars to 2.20 molar. In case of the hydroxylamine, it is used, preferably, the concentration of 224 millimolar.

In a way of carrying out the present process, the reducing agent and the sulphur source are defined by sodium dithionite, in the same concentrations cited above for the reducing agent and for the sulphur source. The nanoparticulate material in the form of a black powder is removed from the autoclave and collected by centrifugation and washed by ultrasound in successive cycles, for example, three, with water and ethanol. Finally, the material is dried in a vacuum furnace in one or two phases, the first of them for a period of 2 h at 120° C., which phase can be followed by another with more two hours, at temperatures which can be defined between 400° C. and 1000° C.

Process for Production of Nanoflowers

In case the nanoparticles, to be obtained, are designed to present the nanoflower morphology, the thermal treatment mentioned above in the step "g" should be carried out at a temperature in the magnitude of 160° C., for a period of 24 h and, preferably, in a furnace with a cylindrical geometry and of vertical axis, to minimize the temperature gradients in the interior of the autoclave. In this case, the fifth aqueous solution should be maintained under stirring by a period from 8 to 12 min and at a temperature from 50° C. to 90° C., preferably of 70° C., for its homogenization before being conducted to the autoclave, for the production of nanoparticles with nanoflower morphology.

Process for Production of Nanospheres

The methodology for the production of the nanoparticles in the form of nanospheres is similar to the description above regarding the nanoflowers. A relevant difference in this case results from the introduction of a modifying agent in the reaction solution.

For the production of nanospheres, the present process further comprises the step of dissolving a morphology modifying agent in a solvent comprising water and heated between 50° C. and 90° C., preferably 70° C., forming a sixth aqueous solution, and adding the latter to the fifth aqueous solution, before being conducted to the autoclave, for the production of nanoparticles with nanosphere morphology.

According to the invention, the morphology modifying agent can be defined by sodium saccharin ($C_7H_4NNaO_3S \cdot 2H_2O$) in concentrations which can range from 1 millimolar to 150 millimolar.

In a process variant, which uses another morphology modifying agent, it is further provided the step of adding, under stirring and directly in the fifth aqueous solution, a morphology modifying agent selected from: PVP, PEG, ethylene diamine either pure or mixed with water, sodium dodecyl sulfate (SDS), sodium dodecyl benzene (DBS), and cetyltrimethyl ammonium bromide (CTAB), in concentrations which can range from 1 millimolar to 150 millimolar, preferably 15 millimolar, before said fifth aqueous solution is conducted to the autoclave, for the production of nanoparticles with nanosphere morphology. The ethylene diamine, when used pure, dispenses the use of the reducing agent.

Functionalization of the Nanoparticles for Forming Oil-Based Lubricant Composition For the formation of oil-based lubricant compositions, the nanoparticles (nanospheres and nanoflowers) should be submitted to a functionalization by a solvothermal process, which comprises the steps of:

dispersing the dry nanoparticles, obtained in step "i" of the process for obtaining nanoparticles, in a solvent selected from ethanol and the like, isopropanol and the like, acetone and the like, chloroform, methylene chloride and tetrachloromethane and the like, pure or in mutual combinations, said dispersion being formed in concentrations from 0.100 to 1.000 grams of nanoparticles, for 100 ml of solvent, preferably in concentrations of 0.400 g of nanoparticles for 100 ml of solvent;

containing the dispersion in an autoclave, with a construction as already defined above and which is taken to an electric oven or microwave oven, so that the dispersion is submitted to a heating from 100° C. to 200° C., preferably 120° C., by a time period from 1 h to 12 h, preferably 2 h, making the nanoparticles become lipophilic; and cooling the dispersion, collecting the lipophilic nanoparticles (nanospheres or nanoflowers), usually by centrifugation, and drying them, for example, in a vacuum furnace, at a temperature from 100° C. to 200° C., by a time period from 2 h to 6 h, to obtain nanoparticles in the form of a fine and loose black powder which can be stored and which is ready to be used to be dispersed in different types of lubricant oils such as, for example, those used in hermetic refrigeration compressors.

The first function of this solvothermal treatment is to remove the molecules of residual water which are stuck in microscopic traps of the nanostructured material, which treatment can be accompanied by its infrared spectrum. Another function of this solvothermal treatment is to provide a superficial modification of the nanoparticles, possibly by the chemisorption or functionalization with the organic solvent, which functions, when taken together, allow giving a lipophilic characteristic to the nanoparticles.

The lipophilic nanoparticles obtained by the solvothermal treatment described above can be used to form a lubricant composition comprising from 0.01% to 5%, by total weight of the composition, of said lipophilic nanoparticles dispersed in a lubricant oil defined as a function of each specific application for said lubricant composition.

For the formation of the lubricant composition, the black powder of nanoparticles, in the nanoflower and nanosphere morphologies, is added to a lubricant oil adequate to each application, in the appropriate concentration. The dispersion of the nanoparticle power is made, initially, with the aid of a mechanical dispersing device of the centrifugal type, in rotations from about 1,000 rpm to 15,000 rpm and, subsequently, said dispersion is finalized in an ultrasonic processor with a titanium tip, for at least 10 minutes with a power from 10 W to 120 W, depending on the volume processed. The dispersions in oils of tribological interest have from 0.01% to 5% by weight of nanoparticles. Dispersions with additives above 2% by weight present a higher cost, and can be considered appropriate for specific cases. The dispersions with the nanoflowers are more stable than with the nanospheres. The stability of the dispersions with the nanoflowers, as well as their tribological behavior, is significantly dependent on the lubricant oil used.

Capping the Nanoparticles for Forming Water-Based Lubricant Composition

For the formation of water-based lubricant compositions, the nanoparticles (nanospheres and nanoflowers) should be submitted to a capping process, which comprises the step of adding, to the fifth aqueous solution, defined in step "f" of the process for production of nanoparticles, a capping agent, in the concentration from 1.0 millimolar to 1.0 molar, selecting from shellac or the like, PVP, a cationic surfactant as the cetyltrimethyl ammonium bromide (CTAB) and anyone from the family of tertiary amines, so as to make the nanoparticles become hydrophilic.

In a variant of the hydrophilic treatment commented above, said treatment can be made by means of the steps of:
  redispersing, in water, the dry nanoparticles obtained in step "i" of the process for production of nanoparticles;
  adding to the aqueous dispersion of dry nanoparticles, a capping agent, in the concentration from 1.0 millimolar to 1.0 molar, selected from shellac or the like, PVP, a cationic surfactant, as the cetyltrimethyl ammonium bromide (CTAB) and anyone from the family of the tertiary amines;
  submitting the aqueous dispersion of dry nanoparticles and capping agent to a thermal treatment in their boiling temperature, in a reflux apparatus, for a time interval from 1.0 h to 4.0 h, so as to make the nanoparticles become hydrophilic;
  conducting the hydrophilic nanoparticles to any of steps of: dispersing them directly in an aqueous base to form an aqueous lubricant composition; and drying them to be stored for future use.

The hydrophilic nanoparticles obtained by the hydrothermal treatment described above can be used to form a lubricant composition comprising from 0.05% to 5%, by total weight of the composition, of said hydrophilic nanoparticles dispersed in water.

The concentrations for aqueous lubrication can range from 0.05% to 5.00% by weight, depending on the tribological regime. The aqueous lubrication is employed for milder tribological regimes.

EXAMPLES

Example 01

Production of Nanoflowers a) 0.880 g of ammonium molybdate $((NH_4)_6Mo_7O_{24} \cdot 4H_2O)$ was dissolved in 15 ml of distilled water which was at 70° C., under stirring;

b) 0.700 g of hydroxylamine hydrochloride $(NH_2OH \cdot HCl)$ was dissolved in 15 ml of distilled water which was at 70° C. and mixed with a solution of item (a), under strong stirring;

c) The pH of the solution was adjusted in 7.0 with ammonium hydroxide $(NH_4OH)$;

d) 0.760 g of thiourea $(NH_2CSNH_2)$ was dissolved in 15 ml of distilled water which was at 70° C. and mixed with the solution obtained in item (c), under strong stirring;

e) The solution is maintained for 10 min at 70° C., under stirring, so as to promote a perfect homogenization of the reagents.

f) The solution of item (e) was transferred to a stainless steel autoclave lined with Teflon and with a capacity of 55 ml which, after being hermetically sealed, is conducted to the furnace at 160° C. for 24 h.

g) The autoclave was removed from the furnace and allowed to cool under forced ventilation to the room temperature.

h) The procedure for washing the sample is described below:
  the material was centrifugated (4000 rpm) in test tubes to decant all the solid in suspension.
  then, it is washed with distilled water, redispersed in ultrasound for 3 min and centrifuged again to separate the solid fraction. Since it is a very fine dispersion, the above-cited washing cycle in water is repeated three times, followed by more three cycles, through which the distilled water is replaced by ethanol.

i) After the washing cycles, the nanoparticles were dried at 150° C./2 h in vacuum.

FIG. 1A shows the micrograph MEV in which the sample of Example 1 was magnified 20,000 times; the sample is presented uniform, in the nanoflower morphology with average diameter of 250 nm. These nanoflowers are formed by the stacking of nanoplates with an estimated average thickness of 15 nm. The corresponding X-ray diffraction presented in FIG. 1B shows a profile of widened lines, due to the presence of a large number of defects and voltage variations, typical of a nanostructured material; it can be identified through the card ICDD 00-006-0097 as referring to the phase $2H-MoS_2$, this being the only phase present.

Figure 1B:
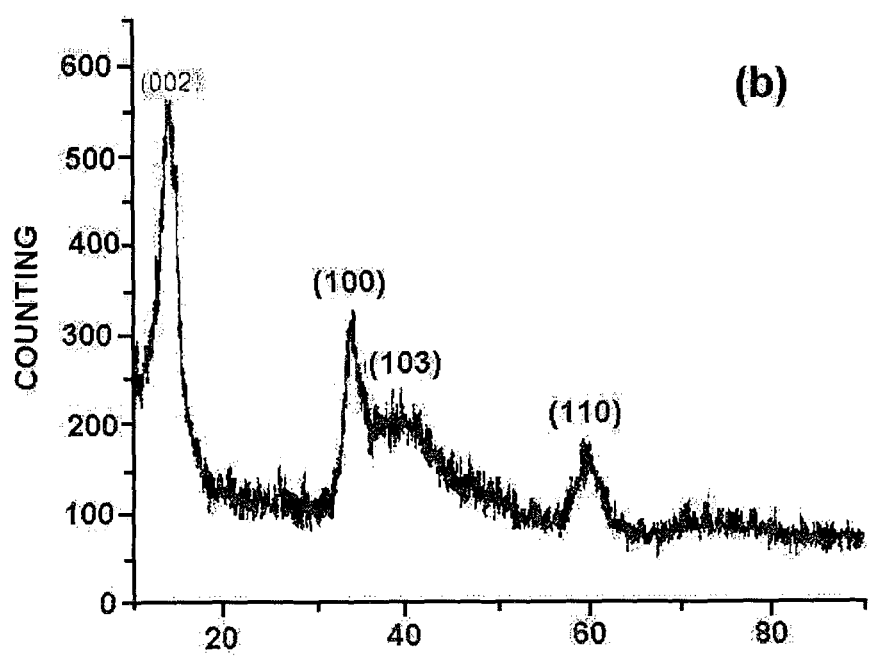
FIG. 1B represents the X-ray diffractogram, with radiation of copper, of the same sample represented in FIG. 1A.

It is noted that there is a significant shift from the most intense peak which corresponds to the plane (002), of 14.4° in the structure 2H, to 9.5° in FIG. 1B, which shows that it is occurring a considerable expansion of the parameter along the axis c. As a consequence, the distance between the lamellas, which in the crystalline phase 2H—$MoS_2$ is of 0.615 nm, expands to 0.951 nm in the nanoflowers of this sample. Thus, it can be estimated that each nanoplate that forms the nanoflowers is formed by the stacking, on average, of only 15.8 lamellas of molybdenum disulphide.

Example 2

Production of Nanospheres a) 0.440 g of ammonium molybdate (($NH_4$)$_6Mo_7O_{24}$.$4H_2O$) was dissolved in 17 ml of distilled water which was at 70° C., under stirring;

b) 0.475 g of sodium dithionite ($Na_2S_2O_4$) was dissolved in 17 ml of distilled water which was at 70° C. and mixed with the solution of item (a), under strong stirring;

c) The pH of the solution was adjusted in 7.0 with ammonium hydroxide ($NH_4OH$).

d) 1.0 ml of PEG 400 was dissolved in 10 ml of distilled water which was at 70° C. and mixed to the solution of item (c).

e) The solution of item (d) was transferred to a stainless steel autoclave of 55 ml, lined with Teflon, which is sealed and conducted to the furnace at 160° C./24 h. In this example, it is not added the thiourea, since the sodium dithionite plays the role of a reducing agent and of a sulphur source;

f) The protocol is followed from item (g) of Example 1.

Figure 2:
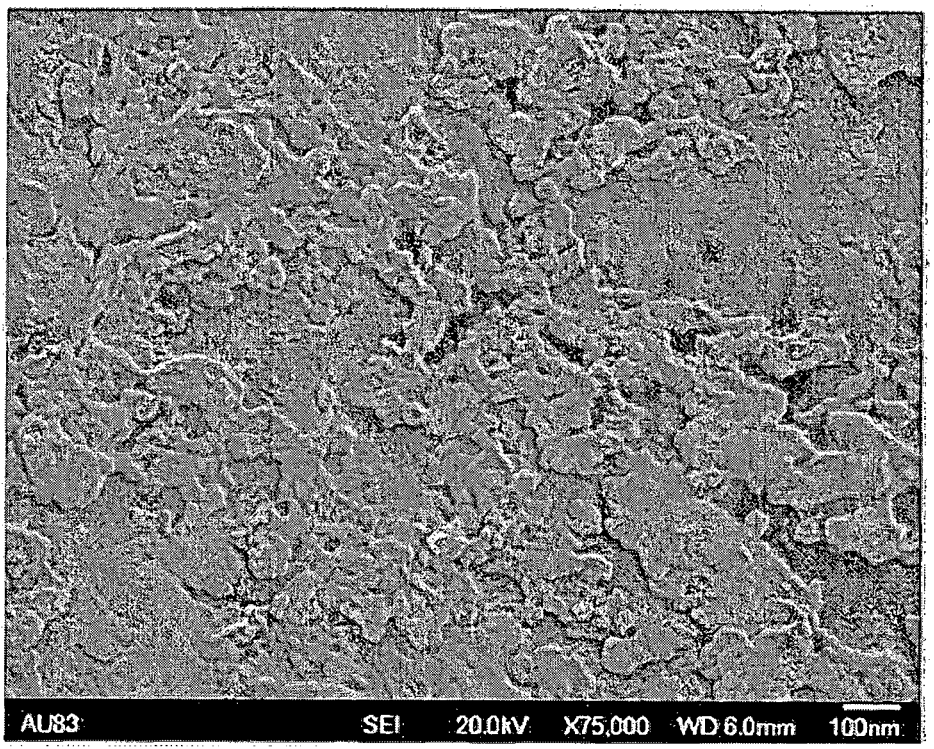
FIG. 2 represents a micrograph (MEV) of the sample of Example 2, synthesized with sodium dithionite which acts as a reducing agent and a sulphur source, and in which it can be observed the formation of $MoS_2$ nanospheres with average diameters of 20 nm.

Appended FIG. 2 is a micrograph MEV, in which the sample of Example 2 was magnified 75,000 times, and in which spherical nanoparticles with diameters of 20 nm can be observed.

Example 3

Production of Nanospheres a) 0.880 g of ammonium molybdate (($NH_4$)$_6Mo_7O_{24}$.$4H_2O$) was dissolved in 15 ml of distilled water which was at 70° C., under stirring;

b) 0.700 g of hydroxylamine hydrochloride ($NH_2OH.HCl$) was dissolved in 15 ml of distilled water which was at 70° C. and mixed with the solution of item (a), under strong stirring;

c) The pH of the solution was adjusted in 7.0 with ammonium hydroxide ($NH_4OH$).

d) 0.760 g of thiourea ($NH_2CSNH_2$) was dissolved in 10 ml of distilled water which was at 70° C. and mixed with the solution obtained in item (c), under strong stirring;

e) 0.133 g of sodium saccharin was dissolved in 5 ml of distilled water which was at 70° C. and added to the solution.

f) The protocol is followed from item (e) of Example 1.

Figure 3:
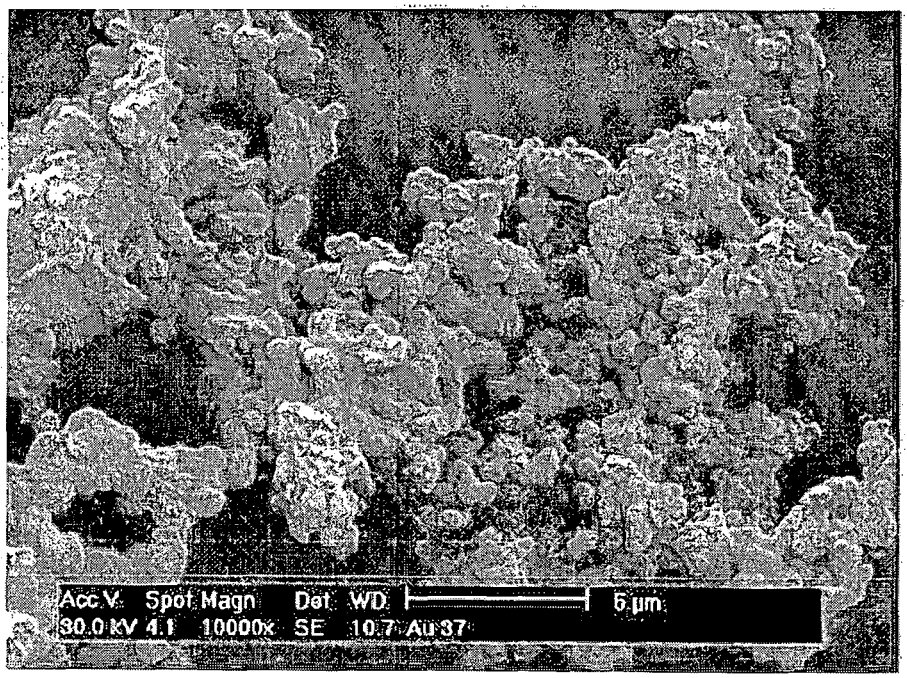
FIG. 3 represents a micrograph (MEV) of the sample of Example 3, synthesized with the sodium saccharin modifying agent, and in which it can be observed the formation of $MoS_2$ spherical particles with average diameters of 830 nm.

Appended FIG. 3 is a micrograph MEV in which the sample of Example 3 was magnified 10,000 times, and in which the influence of the saccharin as a modifying agent can be observed. The particles are now spherical with an average diameter of 830 nm.

Example 4

Production of Nanospheres a) 0.900 g of ammonium molybdate (($NH_4$)$_6Mo_7O_{24}$.$4H_2O$) was dissolved in 15 ml of distilled water which was at 70° C., under stirring;

b) 0.720 g of hydroxylamine hydrochloride ($NH_2OH.HCl$) was dissolved in 15 ml of distilled water which was at 70° C. and mixed with the solution of item (a), under strong stirring;

c) The pH of the solution was adjusted in 7.0 with ammonium hydroxide ($NH_4OH$);

d) 0.764 g of thiourea ($NH_2CSNH_2$) was dissolved in 15 ml of distilled water which was at 70° C. and mixed with the solution obtained in item (c), under strong stirring;

e) 0.130 g of PVP was added to the solution obtained in item (d), under strong stirring.

f) It follows the protocol from item (e) of Example 1.

Figure 4:
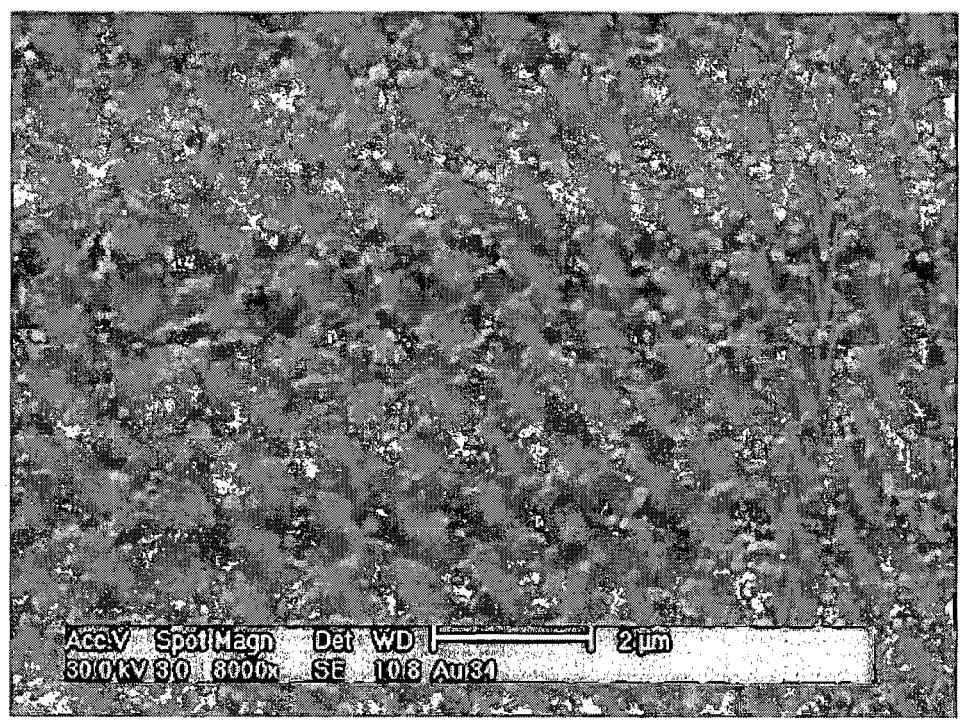
FIG. 4 represents a micrograph (MEV) of the sample of Example 4, synthesized with the PVP modifying agent, and in which it can be observed the formation of $MoS_2$ nanospheres with average diameters of 100 nm.

Appended FIG. 4 is a micrograph MEV in which the sample of Example 4 was magnified 8,000 times, and in which spherical nanoparticles with diameters of 100 nm can be observed.

The invention claimed is:

1. A process for production of solid lubricant nanoparticles, obtained from molybdenum or tungsten compounds to form lamellar metallic disulphides, characterized in that it comprises the steps of:
   a—dissolving, under stirring, a source of the metallic element which defines the solid lubricant, in a solvent comprising water and heated between 50° C. and 90° C., forming a first aqueous solution;
   b—dissolving, under stirring, a reducing agent selected from hydroxylamine, sodium hypophosphite and sodium borohydride, in a solvent comprising water and heated between 50° C. and 90° C., forming a second aqueous solution;
   c—mixing the first and second aqueous solutions, forming a third aqueous solution, containing the metallic element which defines the solid lubricant and the reducing agent;
   d—adjusting the pH of the third aqueous solution, to a neutral condition;
   e—dissolving, under stirring, a sulphur source, in a solvent comprising water and heated between 50° C. and 90° C., forming a fourth aqueous solution;
   f—mixing the third and fourth aqueous solutions, forming a fifth aqueous solution, containing the metallic element, the reducing agent and the sulphur;
   g—containing the fifth aqueous solution in an autoclave and submitting it to heating for a period from 3 h to 150 h, and at a temperature from 100° C. to 350° C.;
   h—cooling the fifth aqueous solution, still contained in the autoclave, to the room temperature, as a function of the morphological characteristics of the nanoparticles to be obtained; and
   i—removing, from the autoclave, the nanoparticles obtained in the powder form, and submitting them to water-washing and drying operations.

2. The process, as set forth in claim 1, characterized in that the solid lubricant is selected from molybdenum disulphide and tungsten disulphide.

3. The process, as set forth in claim 2, characterized in that the source of the metallic element, which defines the solid lubricant, is selected from ammonium molybdate, metallic molybdenum, molybdenum dioxide and molybdenum trioxide, sodium tungstate, tungstic acid, tungstic anhydride and tungsten oxide IV, in concentrations ranging from 8.0 millimolar to 1.00 molar.

4. The process, as set forth in claim 1, characterized in that the sulphur source is selected from thiourea and elemental sulphur, in concentrations ranging from 20 millimolar to 2.20 molar.

5. The process, as set forth in claim 1, characterized in that the reducing agent is present in concentrations ranging from 20 millimolar to 2.20 molar.

6. The process, as set forth in claim 1, characterized in that the sulphur source is defined by sodium dithionite, in concentrations ranging from 20 millimolar to 2.20 molar.

7. The process, as set forth in claim 1, characterized in that the fifth aqueous solution is maintained under stirring for a period from 8 to 12 min and at a temperature from 50° C. to 90° C., for its homogenization before being conducted to the autoclave, in the interior of which the fifth solution is maintained at a temperature in the magnitude of 160° C. and during a period of 24 h, for the production of nanoparticles with nanoflower morphology.

8. The process, as set forth in claim 1, characterized in that it further comprises the step of dissolving a morphology modifying agent in a solvent comprising water and heated between 50° C. and 90° C., forming a sixth aqueous solution, and adding the latter to the fifth aqueous solution, before being conducted to the autoclave, for the production of nanoparticles with nanosphere morphology.

9. The process, as set forth in claim 8, characterized in that the morphology modifying agent is sodium saccharin in concentrations which can range from 1 millimolar to 150 millimolar.

10. The process, as set forth in claim 1, characterized in that it further comprises the step of adding, under stirring and directly in the fifth aqueous solution, a morphology modifying agent selected from: PVP, PEG, pure ethylene diamine or mixed with water, sodium dodecyl sulfate, sodium dodecyl benzene, and cetyltrimethyl ammonium bromide in concentrations which can range from 1 millimolar to 150 millimolar, before said fifth aqueous solution is conducted to the autoclave, for the production of nanoparticles with nanosphere morphology.

11. The process, as set forth in claim 1, characterized in that it includes the steps of:
dispersing the dry nanoparticles, obtained in step "i" of claim 1, in a solvent selected from absolute ethanol and the like, acetone and the like, chloroform, methylene chloride and tetrachloromethane and the like, pure or in mutual combinations, said dispersion being formed in concentrations from 0.100 to 1.000 gram of nanoparticles for 100 ml of solvent; and containing the dispersion in an autoclave and submitting it to a heating from 100° C. to 200° C. for a time period from 1 h to 12 h, making the nanoparticles become lipophilic.

12. The process, as set forth in claim 1, characterized in that it includes the step of adding, to the fifth aqueous solution, defined in step "f" of claim 1, a capping agent, in the concentration from 1.0 millimolar to 1.0 molar, selected from shellac or the like, PVP, a cationic surfactant as the cetyltrimethyl ammonium bromide (CTAB) and anyone from the family of the tertiary amines, so as to make the nanoparticles become hydrophilic.

13. The process, as set forth in claim 1, characterized in that it includes the steps of:
redispersing, in water, the dry nanoparticles obtained in step "i" of claim 1;

adding, to the aqueous dispersion of dry nanoparticles, a capping agent, in the concentration from 1.0 millimolar to 1.0 molar, selected from shellac or the like, PVP, a cationic surfactant as the cetyltrimethyl ammonium bromide (CTAB), and anyone from the family of the tertiary amines;

submitting the aqueous dispersion of dry nanoparticles and the capping agent to a thermal treatment in their boiling temperature, in a reflux apparatus, for a time interval from 1.0 h to 4.0 h, so as to make the nanoparticles become hydrophilic; and conducting the hydrophilic nanoparticles to any of the steps of: dispersing them directly in an aqueous base, to form an aqueous lubricant composition; and drying them to be stored for future use.

* * * * *